US009404286B2

(12) United States Patent
Stevens

(10) Patent No.: US 9,404,286 B2
(45) Date of Patent: Aug. 2, 2016

(54) KEY TRAPPING DEVICE, SYSTEM, AND METHOD OF USE THEREOF

(76) Inventor: Stacy Joan Stevens, Evansville, IN (US)

( * ) Notice: Subject to any disclaimer, the term of this patent is extended or adjusted under 35 U.S.C. 154(b) by 1478 days.

(21) Appl. No.: 13/088,782

(22) Filed: Apr. 18, 2011

(65) Prior Publication Data

US 2011/0253560 A1 Oct. 20, 2011

Related U.S. Application Data

(60) Provisional application No. 61/324,795, filed on Apr. 16, 2010.

(51) Int. Cl.

| | |
|---|---|
| ***G05B 19/00*** | (2006.01) |
| ***E05B 17/22*** | (2006.01) |
| *E05B 47/00* | (2006.01) |
| *E05B 47/02* | (2006.01) |
| *E05B 19/00* | (2006.01) |

(52) U.S. Cl.

CPC ........... *E05B 17/223* (2013.01); *E05B 19/0005* (2013.01); *E05B 47/0012* (2013.01); *E05B 47/02* (2013.01); *E05B 2047/0017* (2013.01); *Y10T 70/8676* (2015.04)

(58) Field of Classification Search

USPC .......... 70/63, 456 R; 109/45, 59 R; 206/37.1, 206/37.2, 37.3, 37.4, 37.5, 37.6, 37.7, 38.1, 206/37.8

See application file for complete search history.

(56) References Cited

U.S. PATENT DOCUMENTS

| | | | | |
|---|---|---|---|---|
| 4,196,347 | A | | 4/1980 | Hadley |
| 4,754,629 | A | | 7/1988 | Allen |
| 5,274,550 | A | | 12/1993 | Greenlee |
| 5,291,898 | A | | 3/1994 | Wolf |
| 5,563,579 | A | | 10/1996 | Carter |
| 5,833,054 | A | * | 11/1998 | Graves ......................... 206/38.1 |
| 6,726,636 | B2 | | 4/2004 | Der Ghazarian et al. |
| 6,819,248 | B2 | | 11/2004 | Gotfried |
| 7,204,335 | B2 | | 4/2007 | Stewart et al. |
| 7,934,577 | B2 | | 5/2011 | Walter et al. |
| 8,146,736 | B2 | * | 4/2012 | Downes ....................... 206/37.2 |
| 8,195,406 | B2 | | 6/2012 | Do et al. |
| 8,207,816 | B2 | | 6/2012 | Crigger et al. |
| 2004/0085187 | A1 | * | 5/2004 | Gotfried et al. .............. 340/5.52 |
| 2006/0180378 | A1 | | 8/2006 | Nordin |
| 2006/0182661 | A1 | | 8/2006 | Aquila |
| 2006/0253711 | A1 | * | 11/2006 | Kallmann ..................... 713/186 |
| 2007/0144812 | A1 | | 6/2007 | Stewart et al. |
| 2011/0253560 | A1 | | 10/2011 | Stevens |
| 2012/0055726 | A1 | | 3/2012 | Hannon |
| 2012/0112879 | A1 | | 5/2012 | Ekchian et al. |

FOREIGN PATENT DOCUMENTS

| | | | |
|---|---|---|---|
| EP | 1703045 | A1 | 9/2004 |
| GB | 2392201 | | 2/2004 |

* cited by examiner

*Primary Examiner* — Jacob K Ackun

(74) *Attorney, Agent, or Firm* — Arent Fox LLP

(57) ABSTRACT

Devices, methods, and systems for providing physical retention of a key or keys, such one or more vehicle keys or keys to a safe, and for providing an input feature, such as a breath or blood analysis device, and other features to prevent access to the keys until a suitable input is provided. For example, each key may be physically retained and prevented from being used until a breath, blood, or other sample input has been received that indicates a blood alcohol level is below a predetermined limit, such as a legal limit for driving a vehicle. Various features then allow release of the key upon the legal limit being met.

16 Claims, 5 Drawing Sheets

KEY TRAPPING DEVICE, SYSTEM, AND METHOD OF USE THEREOF

This application claims priority to Applicant's co-pending U.S. Provisional Patent Application No. 61/324,795 titled "KEY TRAPPING DEVICE" filed Apr. 16, 2010, the entirety of which is hereby incorporated by reference herein.

FIELD OF THE INVENTION

Aspects of the present invention relate to the field of securing and preventing or deterring unwanted access to a key, such as a vehicle key or a safe key, and for providing only authorized access of such key, such as via one or more security features. In particular, such security features may include features to prevent access to the key by an individual having a blood alcohol level above a predetermined level.

BACKGROUND OF THE INVENTION

There remains an unmet need for devices, methods, and systems for preventing access to keys, such as vehicle keys, by individuals having blood alcohol levels above predetermined limits, such as legal limits for driving.

SUMMARY OF THE INVENTION

Aspects of the present invention relate to devices, methods, and systems for providing physical retention of a key, such as vehicle key or a key to a safe, and for providing an a sampling, such as a breath or blood input mechanism and analysis device (e.g., a breathalyzer, as is known in the related art), and other features which are used to prevent access to the key until a suitable input is provided. For example, the key may be physically retained and prevented from being used until a breath input has been received that indicates a blood alcohol level below a pre-determined limit, such as a legal limit for driving a vehicle.

In use, for example, a user, such as a person in a bar who plans to drive after drinking (or, for example, a bar representative, such as a bartender) may engage a key with a key retention device so that the key is secured and cannot be easily removed and used for operation of a vehicle. Upon the person indicating a desire to operate a vehicle, that person may be required to provide a sample (e.g., blow into a breath receiving mechanism on or operably connected to the key retention device). The sample is then analyzed to determine blood alcohol content, and the result of that analysis is compared to a pre-determined level, such as a legal blood alcohol limit for driving. The key is then released only upon the result being acceptable.

The device may also be used by the individual driving the car, for example, to allow the individual to prevent themself from driving in an unacceptable condition.

The key retention device of some variations in accordance with aspects of the present invention may be combined with or separate from the sample input mechanism and/or combined with or separate from the analyzing features. For example, if separate, such features may communicate in a system via couplings, such as wired, wireless, or fiberoptic links.

Features in accordance with aspects of the present invention may further include a power supply, either located within or separate from the device or system, sensors and/or other features for chemically or otherwise sensing the sample, a processor and memory, such as an internal processor or external terminal for providing the logical analysis, comparison, and/or other logical functions, and for accessing data, such as via a data repository coupled to the processor, electrically or otherwise operated mechanisms for providing key retention, such as a key tumbler for engaging the key and/or a solenoid and other mechanisms for engaging the tumbler with the key. Alternatively, for example, the key may be retained by a tensioning mechanism, such as a wire or other flexible securing feature tensionable via, for example, a winding mechanism operated by the motor.

Additional advantages and novel features relating to aspects of the present invention will be set forth in part in the description that follows, and in part will become more apparent to those skilled in the art upon examination of the following or upon learning by practice thereof.

BRIEF DESCRIPTION OF THE DRAWINGS

Aspects of the present invention will become fully understood from the detailed description given herein below and the accompanying drawings, which are given by way of illustration and example only and thus not limited with respect to aspects of the present invention, wherein.

DETAILED DESCRIPTION

Aspects of the present invention are designed to retain one or more keys and make such keys inaccessible until each person desiring to use a key has reached an acceptable blood alcohol level.

Figure 1:
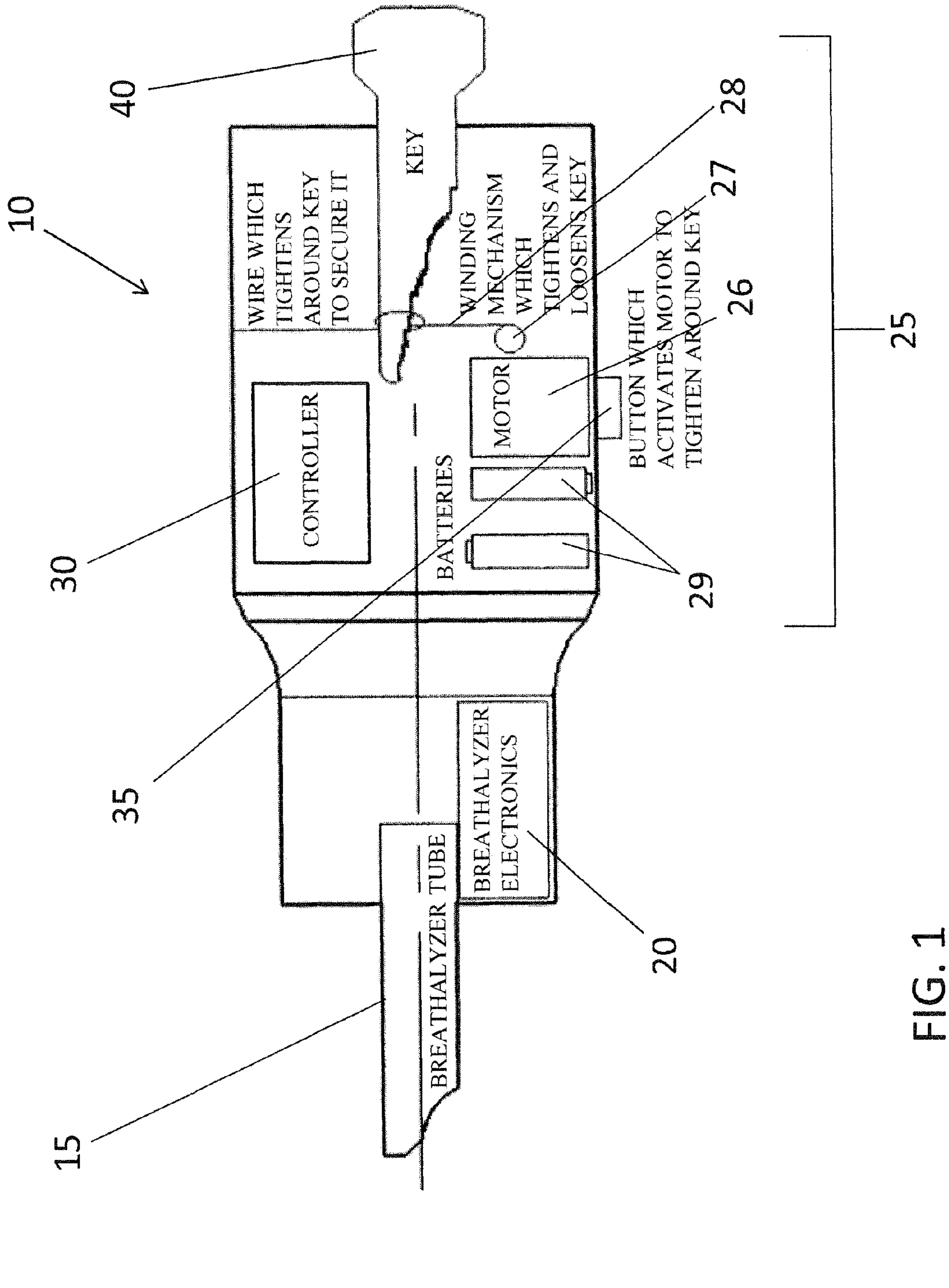
FIG. 1 shows a representative cutaway view of an example standalone device for retaining a key pending analysis of a sample (e.g., a breath input) reflecting an acceptable blood alcohol level.

FIG. 1 shows a representative cutaway view of an example standalone device for retaining a key pending analysis of a sample (e.g., a breath input) reflecting an acceptable blood alcohol level. As shown in FIG. 1, the device 10 may have a housing that contains and/or retains various features, such as: a sampling mechanism 15 (e.g., a tube for receiving a breath input of a person seeking to retrieve the key from the device 10); one or more sensing features 20 for determining via the sample the blood alcohol level of the person; and various key retaining features 25, such a motor 26, a tensioning mechanism 27 for tensionably retaining the key (e.g., by winding a wire or other tensioning features 28), and a power supply or input 29, such as one or more batteries retained in the housing or a power input (e.g., a cord that may be connected to a power outlet); and a controller 30, such as a processing device, for receiving and processing data received from the sensing features 20, for example, and for controlling operation of the motor 26 (e.g., to determine that received data from the sensor 20 reflects a suitable blood alcohol level, based on comparison to a predetermined level, and for causing the release the key 40, such as via turning of the motor 26 to return the tensioning feature 28 to an untensioned state, allowing retrieval of the key). The key retaining features 25, in operation, may retain a key 40.

The device 10 may further include an operation engaging feature 35, such as a button depressable to cause retention of the key. The device 10 may also have other features, such as a display to display sensed blood alcohol level, one or more signal lights (e.g., lights signaling the operation of the key retaining features 25, a sensed level test failure, and/or a sensed level pass), and other signal features, such as audible output.

In operation, the user may initiate key retention, for example, by inserting a key 40 into the device 10 and depressing the operation engaging feature 35, which, in turn, may cause the motor 26 to operate (e.g., via power from the power source 29), turning the tensioning mechanism 27, which winds the tensioning feature 28 (e.g., a wire having a loop for tensionably retaining the key). Upon the tensioning mechanism 27 and the tensioning feature 28 suitably tensioning about the key 30 (e.g., continually operating until sensed resistance to further turning of the tensioning mechanism 27 reaching a predetermined level, such as via monitoring of stall of the motor 26, upon which power to the motor 26 may be automatically discontinued), the motor 26 will stop, and the key 40 will be retainably held within the device 10 via the tensioning feature 28. The controller 30 may, for example, receive motor speed or other information to determine when to discontinue tensioning.

The key 40 may then continue to be retained in the device 10 until suitable conditions for release are met. For example, a sample (e.g., a blood or breath sample) from a person desiring to retrieve the key 40 may be input into the sampling mechanism 15 for delivery to the sensing features 20 (e.g., a breath alcohol analyzer). A signal may be transmitted from the sensing features 20 to the controller 30, such as data reflecting the blood alcohol level sensed. For example, the signal may vary with blood alcohol level, or no signal may output in the absence of reaching a predetermined blood alcohol level.

Upon the signal from the sensing features 20 being received by the controller 30, the controller 30 may determine whether to transmit a signal to the motor 26, to cause release of the key 40. For example, the data transmitted from the sensing features 20 may vary with blood alcohol level, and the controller 30 may compare the transmitted data to predetermined data (e.g., reflecting an acceptable blood alcohol level) to determine whether to transmit a signal to the motor 26 to operate so as to release the key 40. The controller 30 may also output other information relating to the sensed data or operational state, such as converting the sensed data to a display output of a blood alcohol level or to audibly announce the blood alcohol level. The controller 30 may similarly cause lights or other outputs reflecting operational state and/or a pass/fail for the sensed information.

Figure 2:
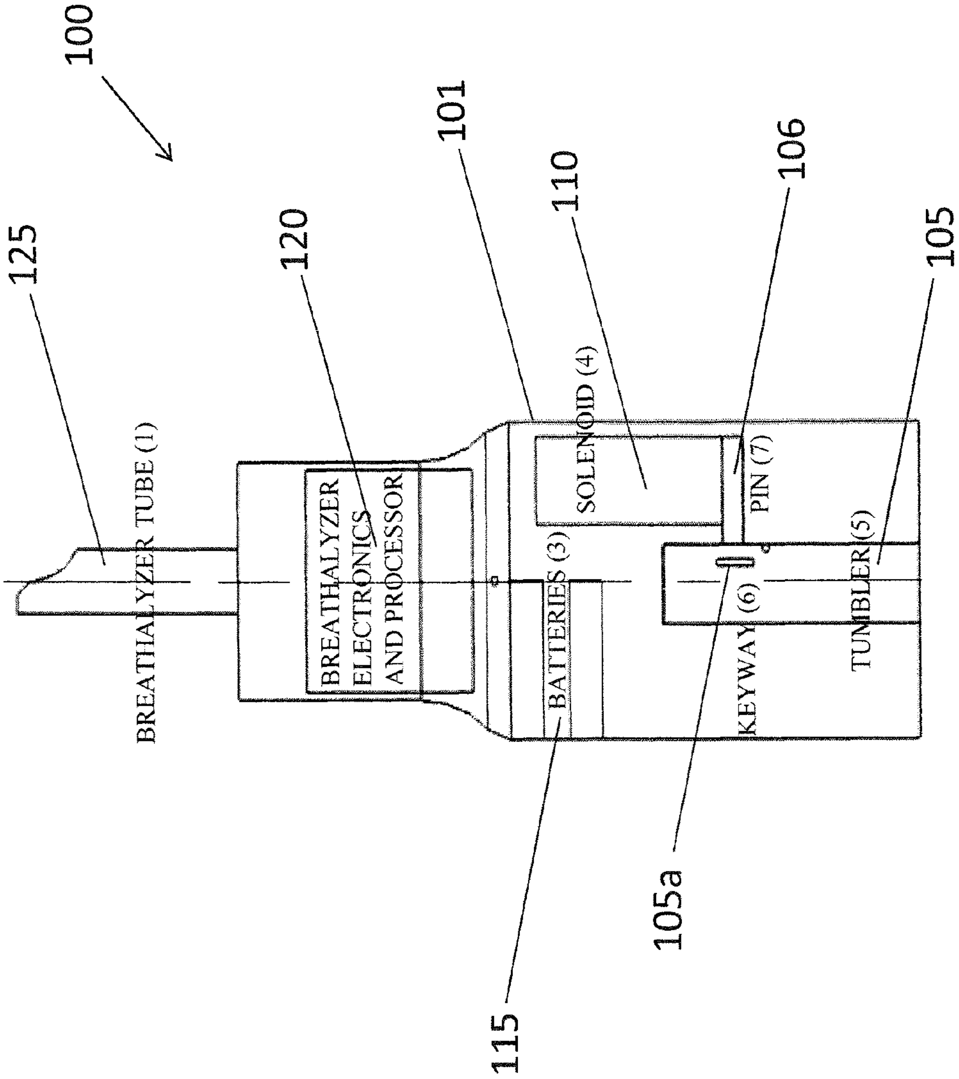
FIG. 2 shows a representative view of another variation of a device, in accordance with aspects of the present invention, for retaining and releasing a key under predetermined conditions, such as acceptable blood alcohol level of a user.

FIG. 2 shows a representative view of another variation of a device, in accordance with aspects of the present invention, for retaining and releasing a key under predetermined conditions, such as acceptable blood alcohol level of a user. As shown in FIG. 2, the device 100 includes a key retention mechanism 105, such as a tumbler for rotationally securing the key, similar to a key engaging lock, or a compression device for compressibly or frictionally securing an inserted key. For example, with a tumbler, upon the key being turned in the tumbler a pre-determined rotational motion (e.g., a quarter turn), a locking feature 106, such as a spring loaded pin or other biased mechanism, may engage a lock receiving feature 105*a*, such as a tumbler pin receiving opening, which prevents further rotation of the tumbler, thereby trapping the key in the tumbler until the locking feature is unlocked (e.g., a solenoid 110 operably engaged with the pin is caused to retract the pin from the pin receiving opening in the tumbler, allowing the tumbler to be rotationally returned to a position allowing release of the key).

Power for operation of the solenoid 110 may be provided by an onboard or external power source 115, such as batteries contained within the housing 101 of the device 100 or an external power input (e.g., a cord input from a power outlet). Control of the solenoid 110 may be governed by a sensing, analyzing, and control device 120, which, in turn, may variably operate, depending on input of sensed information for a sample. The sample may, for example, be a blood or breath input received via an input mechanism 125. The sensing, analyzing, and control device 120 may include, for example, a blood alcohol analyzer for sensing blood alcohol level based on the sample input. The sensing, analyzing, and control device 120 may further include a processor and/or memory for comparing the sensed input to an acceptable level (e.g., blood alcohol level below a predetermined level) and for outputting a signal upon the acceptable level being reached. The output signal may, for example, include a signal to a switch device (e.g., a transistor) to communicate power to the solenoid, thereby causing the pin 106 to be disengaged from the tumbler, thus enabling the tumbler to be rotated and the key removed.

In some variations in accordance with aspects of the present invention, the tumbler, for example, may be designed such that any key can be inserted so as to allow rotation of the tumbler and retention of the key; in these variations, the design would allow a wide range of types of keys to be retained.

Figure 3:
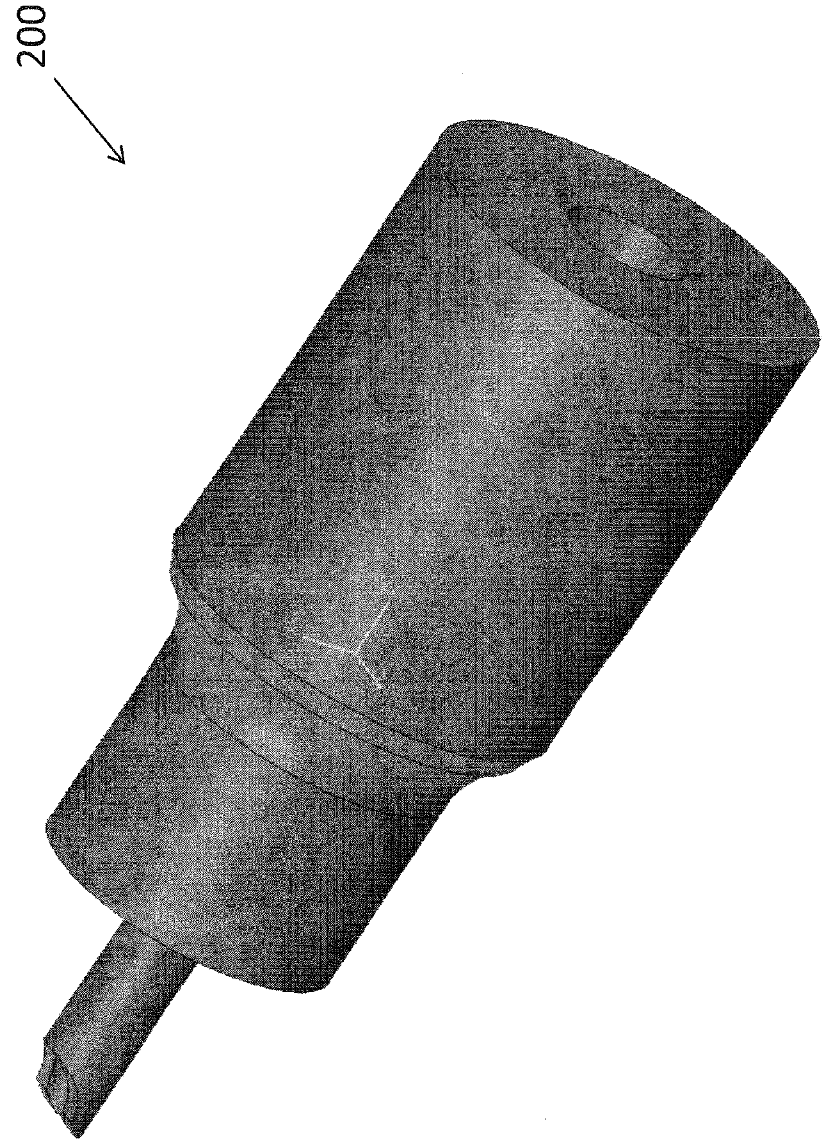
FIG. 3 shows an external perspective view of an example key retention and release device in accordance with the features of FIG. 1.

FIG. 3 shows an external perspective view of an example key retention and release device in accordance with the features of FIG. 1

Figure 4:
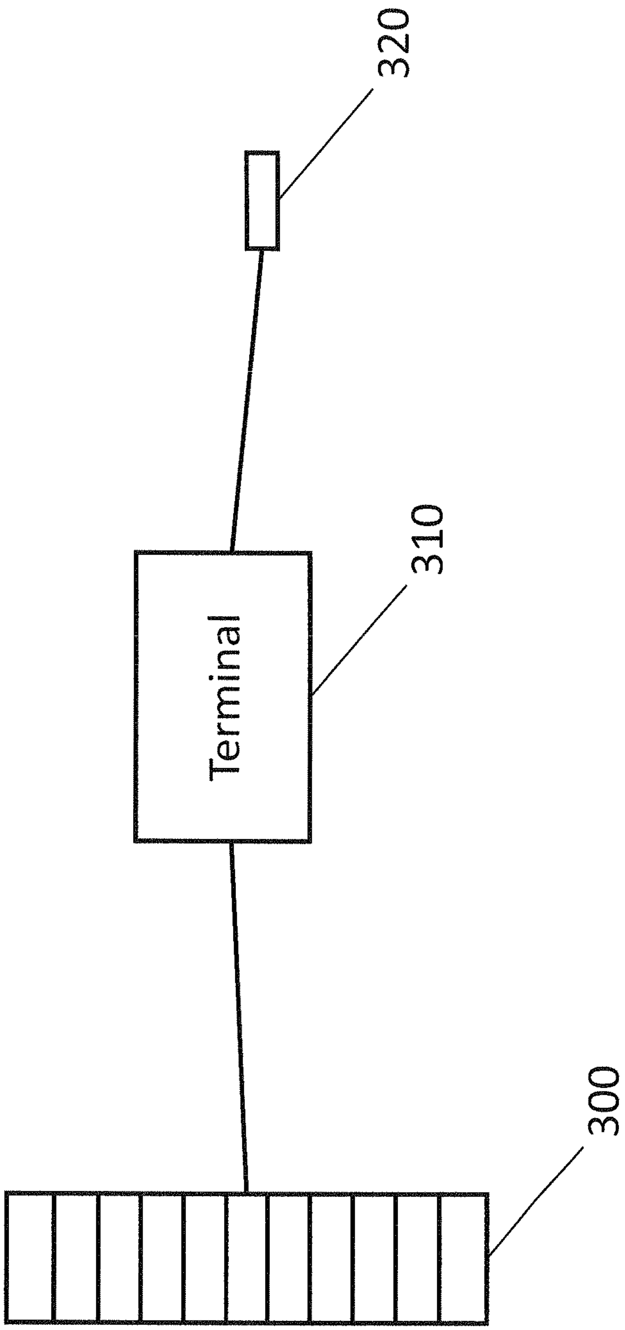
FIG. 4 shows a representative diagram of an example key retaining system in accordance with aspects of the present invention.

FIG. 4 shows a representative diagram of an example key retaining system in accordance with aspects of the present invention. The system of FIG. 4 may used, for example, in a bar or restaurant, to retain and selectively release multiple keys using a single sample input device. As shown in FIG. 4, multiple keys may be retained in key retaining bank 300. For example, keys may be retained and released via the various retaining and releasing mechanisms shown and described with respect to FIGS. 1-3. Selective release of each of the retained keys in the retaining bank may be controlled via a terminal 310 coupled to the key retaining bank 300, the terminal comprising, for example, a personal computer (PC), minicomputer, mainframe computer, microcomputer, telephonic device, or wireless device, such as a personal digital assistant ("PDA") or other hand-held wireless devices for receiving, storing, and processing data. The terminal 310 may include a processor and a repository for data and/or couplings to a repository for data, via, for example, a network, such as the Internet or an intranet. The couplings may include, for example, wired, wireless, or fiberoptic links. The data, for example, may include, in addition to that received from sampling and predetermined level information, individual identification information and corresponding key/location identification information to allow matching of data for individuals to specific keys in the key retaining bank 300.

The terminal 310 may, in turn, be coupled to a sample sensing device, such as a blood or breath sample sensor for receiving a sample via a sample input device, along the lines of the sample input and sensing devices shown and described in conjunction with FIGS. 1-3. A separate input may be provided to associate the sample input with an individual. Such output may be provided via an input device (e.g., a keyboard input for terminal 310), for example, of an individual identifier corresponding to a key retained in the key bank 300. Operation for retention and release of each key for each individual may otherwise be similar to that shown and described with respect to FIGS. 1-3.

Figure 5:
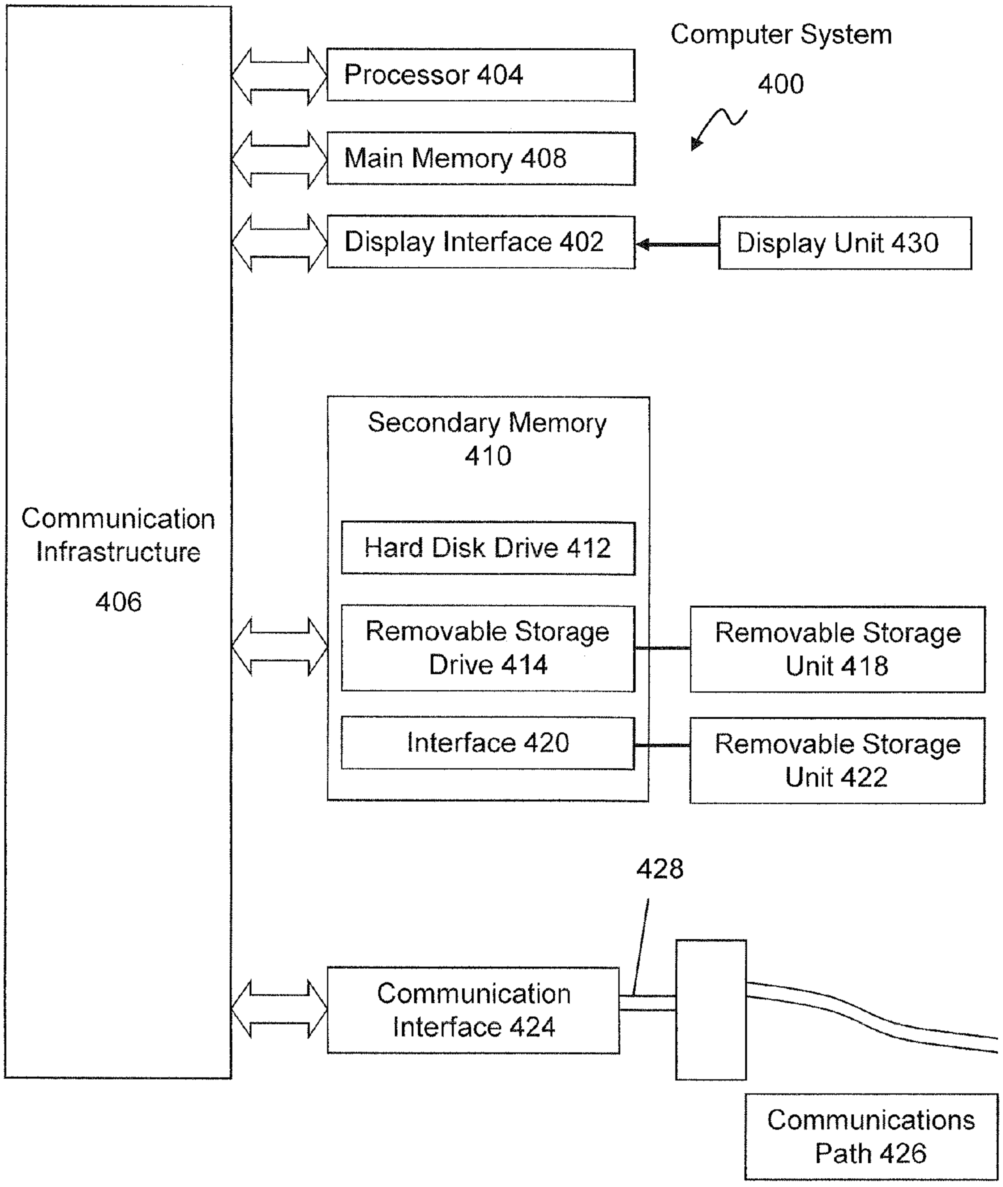
FIG. 5 shows a representative diagram of an example computer system for use in accordance with aspects of the present invention.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 400 is shown in FIG. 5.

Computer system 400 includes one or more processors, such as processor 404. The processor 404 is coupled to a communication infrastructure 406 (e.g., a communications bus, cross-over bar, or network). Various software aspects are described in terms of this example computer system. After reading this description, it will become apparent to a person skilled in the relevant art(s) how to implement aspects hereof using other computer systems and/or architectures.

Computer system 400 may include a display interface 402 that forwards graphics, text, and other data from the communication infrastructure 406 (or from a frame buffer not shown) for display on a display unit 430. Computer system 400 may include a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc. The removable storage drive 414 may read from and/or write to a removable storage unit 418 in a well-known manner. Removable storage unit 418, represents a floppy disk, magnetic tape, optical disk, etc., which may be read by and written to removable storage drive 414. As will be appreciated, the removable storage unit 418 may include a computer usable storage medium having stored therein computer software and/or data.

Alternative aspects of the present invention may include secondary memory 410 and may include other similar devices for allowing computer programs or other instructions to be loaded into computer system 400. Such devices may include, for example, a removable storage unit 422 and an interface 420. Examples of such may include a program cartridge and cartridge interface (such as that found in video game devices), a removable memory chip (such as an erasable programmable read only memory (EPROM), or programmable read only memory (PROM)) and associated socket, and other removable storage units 422 and interfaces 420, which allow software and data to be transferred from the removable storage unit 422 to computer system 400.

Computer system 400 may also include a communications interface 424. Communications interface 424 may allow software and data to be transferred among computer system 400 and external devices. Examples of communications interface 424 may include a modem, a network interface (such as an Ethernet card), a communications port, a Personal Computer Memory Card International Association (PCMCIA) slot and card, etc. Software and data transferred via communications interface 424 may be in the form of signals 428, which may be electronic, electromagnetic, optical or other signals capable of being received by communications interface 424. These signals 428 may be provided to communications interface 424 via a communications path (e.g., channel) 426. This path 426 may carry signals 428 and may be implemented using wire or cable, fiber optics, a telephone line, a cellular link, a radio frequency (RF) link and/or other communications channels. As used herein, the terms "computer program medium" and "computer usable medium" refer generally to media such as a removable storage drive 480, a hard disk installed in hard disk drive 470, and/or signals 428. These computer program products may provide software to the computer system 400. Aspects of the present invention are directed to such computer program products.

Computer programs (also referred to as computer control logic) may be stored in main memory 408 and/or secondary memory 410. Computer programs may also be received via communications interface 424. Such computer programs, when executed, may enable the computer system 400 to perform the features in accordance with aspects of the present invention, as discussed herein. In particular, the computer programs, when executed, may enable the processor 410 to perform the features in accordance with aspects of the present invention. Accordingly, such computer programs may represent controllers of the computer system 400.

Where aspects of the present invention may be implemented using software, the software may be stored in a computer program product and loaded into computer system 400 using removable storage drive 414, hard drive 412, or communications interface 420. The control logic (software), when executed by the processor 404, may cause the processor 404 to perform the functions described herein. in another aspect of the present invention, the system may be implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the present invention may be implemented using a combination of both hardware and software.

Exemplary aspects of the present invention have now been described in accordance with the above advantages. It will be appreciated that these examples are merely illustrative hereof. Many variations and modifications will be apparent to those skilled in the art.

The invention claimed is:

1. A device for retaining and selectively releasing a key, the device comprising:

a housing;

a key retaining mechanism within the housing, the key retaining mechanism being configured to receive the key and to place the key in a retained condition, wherein the key retaining mechanism is configured to be selectively placeable in a key releasing condition;

a sample sensor within the housing configured to analyze a received sample and to output data relating to the analyzed sample; and a control mechanism configured to:

receive the data output from the sample sensor; and upon the received data output meeting a predetermined condition, place the key retaining mechanism in the key releasing condition, wherein the key retaining mechanism comprises one of:

(a) a tensioning mechanism, the tensioning mechanism including:

an electric motor;

a winding mechanism drivably engaged with the electric motor; and a cable windable by the winding mechanism to produce a tension in the cable to tensionably retain the key; or (b) a tumbler having a pin receiving opening;

a pin engageable with the pin receiving opening of the tumbler when the tumbler is in a predetermined rotational position; and a solenoid operably engageable with the pin so as to retract the pin from the pin receiving opening of the tumbler upon the predetermined condition being met.

2. The device of claim 1, wherein the key retaining mechanism comprises (a) the tensioning mechanism.

3. The device of claim 2, further comprising:

a sensing mechanism for sensing the tension;

wherein the control mechanism stops operation of the motor when the tension reached a predetermined tension level.

4. The device of claim 1, wherein the key retaining mechanism comprises (b) the tumbler, the pin, and the solenoid.

5. The device of claim 1, wherein the sample sensor samples a breath input.

6. The device of claim 1, wherein the sample is a breathalyzer.

7. The device of claim 1, wherein the device is a blood analyzer.

8. The device of claim 1, wherein the control mechanism comprises a processor.

9. The device of claim 8, wherein the processor is coupled to a data repository.

10. The device of claim 8, wherein the control mechanism comprises a terminal.

11. The device of claim 8, wherein the terminal is selected from a group consisting of a personal computer, a minicomputer, a main frame computer, a microcomputer, a hand held device, and a telephonic device.

12. The device of claim 1, further comprising:

a power source.

13. The device of claim 1, further comprising:

a display device.

14. The device of claim 1, further comprising:

a sample input mechanism for inputting the received sample.

15. A system for retaining and selectively releasing a plurality of keys, the system comprising:

a key retaining bank, including:

a housing; and a plurality of key retaining mechanisms within the housing, each of the plurality of key retaining mechanisms being configured to receive one of the plurality of keys, to place the received key in a retained condition, and being selectively placeable in a key releasing condition;

a sample sensor operable in conjunction with the key retaining bank and configured to analyze a received sample and to output data relating to the analyzed sample; and a control mechanism configured to:

receive the data output from the sample sensor;

match the received data to one of the plurality of key retaining mechanisms; and upon the received data output meeting a predetermined condition, place the matched one of the plurality of key retaining mechanisms in the key releasing condition, wherein each of the plurality of key retaining mechanisms comprises one of:

(a) a tensioning mechanism, the tensioning mechanism including:

an electric motor;

a winding mechanism drivably engaged with the electric motor; and a cable windable by the winding mechanism to produce a tension in the cable to tensionably retain one of the plurality of keys; or (b) a tumbler having a pin receiving opening;

a pin engageable with the pin receiving opening of the tumbler when the tumbler is in a predetermined rotational position; and a solenoid operably engageable with the pin so as to retract the pin from the pin receiving opening of the tumbler upon the predetermined condition being met.

16. The device of claim 15, wherein the control mechanism comprises a terminal selected from a group consisting of a personal computer, a minicomputer, a main frame computer, a microcomputer, a hand held device, and a telephonic device.

* * * * *